United States Patent
Lobb et al.

(10) Patent No.: US 9,740,187 B2
(45) Date of Patent: Aug. 22, 2017

(54) CONTROLLING HARDWARE IN AN ENVIRONMENT

(71) Applicant: MICROSOFT TECHNOLOGY LICENSING, LLC, Redmond, WA (US)

(72) Inventors: Ken Lobb, Sammamish, WA (US); Andrew Wilson, Seattle, WA (US); Stephen Edward Hodges, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 482 days.

(21) Appl. No.: 13/683,989

(22) Filed: Nov. 21, 2012

(65) Prior Publication Data

US 2014/0142729 A1    May 22, 2014

(51) Int. Cl.
*G06F 17/00* (2006.01)
*G05B 19/045* (2006.01)
*G06F 3/01* (2006.01)
*G06F 3/03* (2006.01)
*G06K 9/00* (2006.01)

(52) U.S. Cl.
CPC .......... *G05B 19/045* (2013.01); *G06F 3/011* (2013.01); *G06F 3/017* (2013.01); *G06F 3/0304* (2013.01); *G06K 9/00335* (2013.01)

(58) Field of Classification Search
CPC  G05B 19/045; G06K 9/00335; G06F 3/0304; G06F 3/011; G06F 3/017
USPC ............................................ 700/90; 382/103
See application file for complete search history.

(56) References Cited

U.S. PATENT DOCUMENTS

| | | | |
|---|---|---|---|
| 2003/0058111 A1* | 3/2003 | Lee .................... | G06K 9/00342 340/573.1 |
| 2005/0125083 A1* | 6/2005 | Kiko .................... | G05B 15/02 700/19 |
| 2008/0062258 A1 | 3/2008 | Bentkovski et al. | |
| 2009/0138805 A1 | 5/2009 | Hildreth | |
| 2009/0180668 A1 | 7/2009 | Jones et al. | |
| 2010/0066676 A1* | 3/2010 | Kramer ................ | G06F 3/017 345/158 |
| 2010/0128112 A1 | 5/2010 | Marti et al. | |

(Continued)

FOREIGN PATENT DOCUMENTS

WO    0232136 A2    4/2002

OTHER PUBLICATIONS

European Patent Office, Second Written Opinion Received for PCT Patent Application No. PCT/US2013/070854; Nov. 17, 2014, 8 Pages.

(Continued)

*Primary Examiner* — Ziaul Karim
(74) *Attorney, Agent, or Firm* — Alleman Hall Creasman & Tuttle LLP (57) ABSTRACT

An instruction-storage machine holds instructions that, when executed by a logic machine, cause the logic machine to find a human subject in depth data acquired with one or more depth cameras arranged to image an environment, and to compute an aspect of the human subject from the depth data. Based on the computed aspect, the logic machine determines a change to be made in the environment and actuates appropriate hardware in the environment to make the change.

17 Claims, 8 Drawing Sheets

(56) References Cited

U.S. PATENT DOCUMENTS

| | | | |
|---|---|---|---|
| 2010/0182136 A1 | 7/2010 | Pryor | |
| 2011/0152726 A1* | 6/2011 | Cuddihy | A61B 5/112 600/595 |
| 2011/0187820 A1 | 8/2011 | Gilboa et al. | |
| 2013/0073093 A1 | 3/2013 | Songkakul | |
| 2013/0182905 A1* | 7/2013 | Myers | H04N 7/18 382/103 |
| 2013/0201316 A1* | 8/2013 | Binder | H04L 67/12 348/77 |
| 2013/0204408 A1 | 8/2013 | Thiruvengada et al. | |
| 2014/0168277 A1 | 6/2014 | Ashley et al. | |

OTHER PUBLICATIONS

Tabar, et al, "Smart Home Care Network using Sensor Fusion and Distributed Vision-Based Reasoning", Retrieved at <<http://wsnl.stanford.edu/papers/vssn06_p145.pdf>>, VSSN '06, 4th ACM international workshop on Video surveillance and sensor networks, 2006, pp. 145-154.

Martin, Hector, "Building a Home Security System with OpenKinect", Retrieved at <<https://codebits.eu/intra/s/session/234>>, Nov. 11, 2011, pp. 3.

Stone, et al., "Evaluation of an Inexpensive Depth Camera for Passive In-Home Fall Risk Assessment", Retrieved at <<http://eldertech.missouri.edu/files/Papers/StoneE/Evaluation%20of%20an%20Inexpensive%20Depth%20Camera.pdf>>, International Conference on Pervasive Computing Technologies for Healthcare (PervasiveHealth) and Workshops, 2011, pp. 71-77.

Panger, Galen, "Kinect in the Kitchen: Testing depth camera interactions in practical home environments", Retrieved at <<http://husk.eecs.berkeley.edu/courses/cs260-fall11/images/7/74/FinalPaper-Panger.pdf>>, Retrieved Date: Mar. 29, 2012, pp. 6.

European Patent Office, International Search Report & Written Opinion for PCT Application No. PCT/US2013/070854, Apr. 9, 2014, 11 Pages.

International Preliminary Examining Authority of the European Patent Office, International Preliminary Report on Patentability Issued in Patent Application No. PCT/US2013/070854, Feb. 13, 2015, 9 Pages.

Mrazovac, B. et al., "Smart Audio/Video Playback Control Based on Presence Detection and User Localization in Home Environment," Proceedings of the 2nd Eastern European Regional Conference on the Engineering of Computer Based Systems, Sep. 5, 2011, Bratislava, Slovakia, 10 pages.

Dixon, C. et al., "An Operating System for the Home," Proceedings of the 9th USENIX Symposium on Networked Systems Design and Implementation (NSDI '12), Apr. 25, 2012, San Jose, California, 16 Pages.

* cited by examiner

CONTROLLING HARDWARE IN AN ENVIRONMENT

BACKGROUND

Computer technology can help people work more efficiently, exercise control over their environments, and better enjoy their lives. However, the advantages that technology brings to people are sometimes undercut by the complex and unnatural modes of interfacing with the technology. In a technologically equipped home, for example, residents may be overwhelmed by the task of keeping numerous independent systems—e.g., security, home-theatre, and climate control systems—keyed to the prevailing preferences, especially if such preferences vary from one family member to the next, evolve over time, or are subject to exceptions.

SUMMARY

One embodiment of this disclosure provides an instruction-storage machine holding instructions that, when executed by a logic machine, cause the logic machine to find a human subject in depth data acquired with one or more depth cameras arranged to image an environment, and to compute an aspect of the human subject from the depth data. Based on the computed aspect, the logic machine determines a change to be made in the environment and actuates appropriate hardware in the environment to make the change.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

This disclosure describes a 'smart system' of interconnected depth cameras and other sensors for monitoring people in an environment, which can be a residence or place of business, for example. Such monitoring is applied to various useful purposes, such as trend assessment, rules-compliance assessment, and the control of autonomously actuable hardware in the environment. Hereinafter, example methods and scenarios are presented to illustrate these modalities in more detail and to demonstrate the broad applicability of the approach now disclosed. Before presenting the methods and scenarios, an example environment and an example smart system will first be described.

Figure 1:
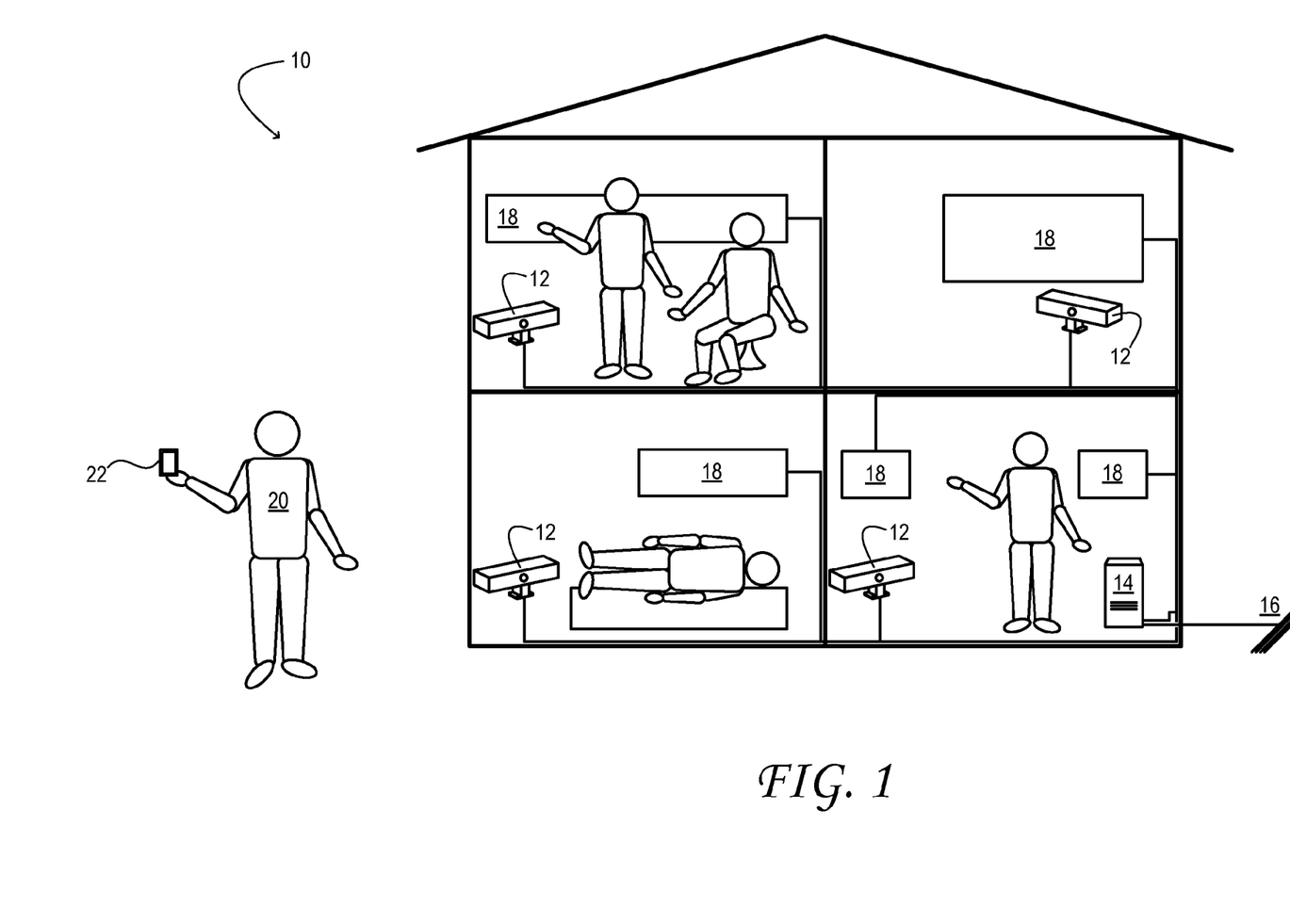
FIG. 1 schematically shows aspects of an example environment in accordance with an embodiment of this disclosure.

FIG. 1 schematically shows aspects of an example environment 10. The illustrated environment is a house—i.e., a personal residence. Nevertheless, the approaches described herein are equally applicable to other environments, such as nursing homes, assisted living facilities, nurseries, retail environments, service environments, workplaces, etc. Environment 10 includes a plurality of rooms—separate interior spaces—with a plurality of people situated in the rooms. Naturally, the people in the rooms may be engaged in activities that define trends or constitute compliance with or deviation from one or more rules. Furthermore, the dispositions and activities of the people may furnish information that reveals a desire to make some change in the state of the environment.

To assess trends, rules compliance, or a desired state change to be made in environment 10, a smart system is installed in the environment. The smart system includes a plurality of depth cameras 12, a computer 14, and various other componentry, as described hereinafter. The computer receives depth data from each of the depth cameras, which are arranged to image the environment. In the illustrated embodiment, the computer is connected to network 16 and to autonomously actuable hardware 18 (shown generically in FIG. 1), which is distributed throughout the environment. Some examples of autonomously actuable hardware include a climate-control system, a home-theatre system, a lighting system, a home-security system, etc.

FIG. 1 also shows a steward 20, which may be a person of authority in the environment, or a person responsible for the security of the environment or for the well-being of any person in the environment. Accordingly, the steward may be defined differently in the different embodiments of this disclosure. The steward may be a head of household, supervisor, or shift manager, for example. In other examples, the steward may not be a single person per se, but a responsible party—e.g., parents, facility staff, law enforcement, or an emergency-response service such as an ambulance service or fire department. Via autonomous messaging from the computer, the steward may be apprised of any ordinary or extraordinary condition in the environment—e.g., a condition that identifies a trend or a deviation from a rule in the environment. Any such message may be sent via network 16, which may include the Internet. The steward may receive the message on his or her mobile device 22, or via a remote computer system, or in any other suitable manner.

Figure 2:
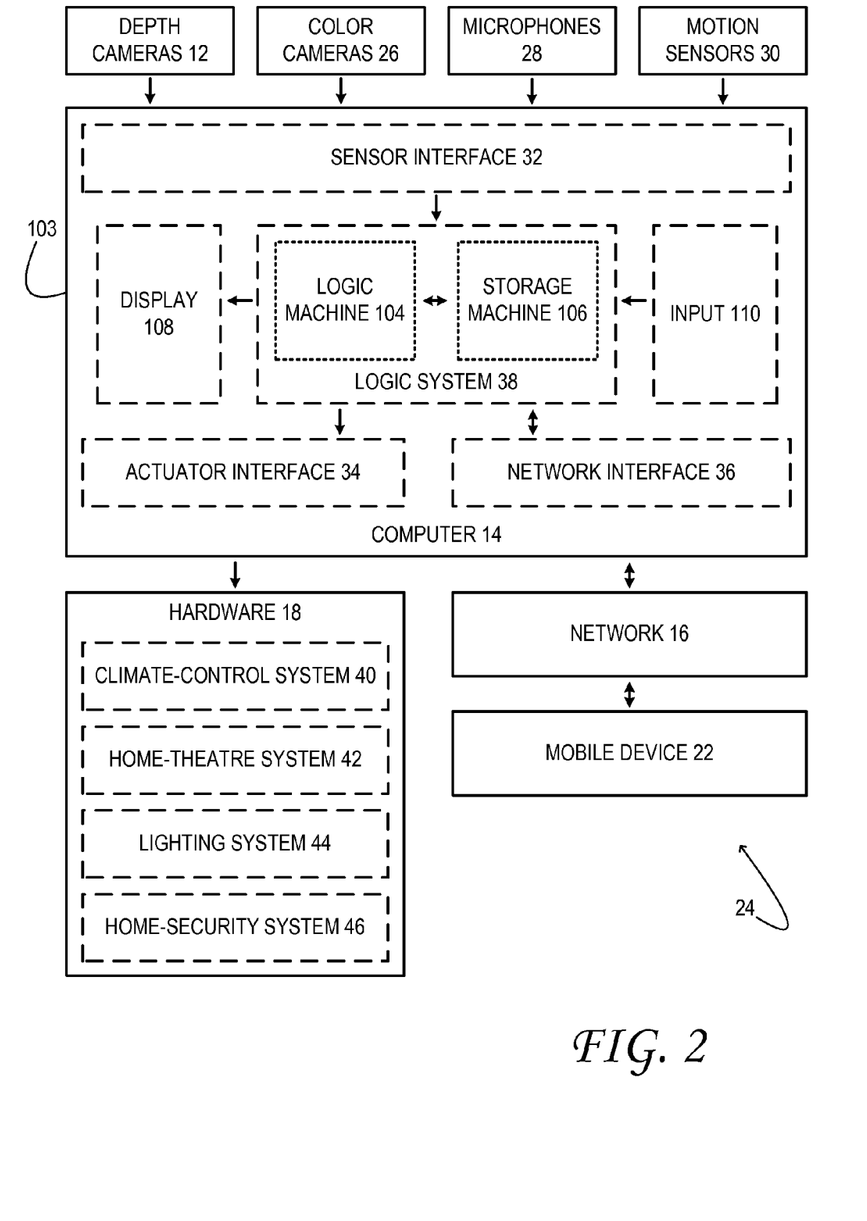
FIG. 2 schematically shows aspects of an example smart system in accordance with an embodiment of this disclosure.

FIG. 2 is a high-level schematic diagram of an example smart system 24. The smart system includes a plurality of color cameras 26 and microphones 28, also distributed throughout environment 10. In some embodiments, the color cameras and/or microphones may be integrated together with depth cameras 12 to provide a combined visual or audio-visual input to computer 14. Optional motion sensors 30 also may be provided—e.g., to reduce system cost or provide greater privacy in certain areas of the environment. Additional sensors may include passive IR sensors, pressure sensors, etc.

In the embodiment of FIG. 2, computer 14 includes sensor interface 32, actuator interface 34, network interface 36, and logic system 38. The sensor interface is the portion of the computer that receives depth data from the one or more depth cameras arranged in the environment, receives other sensory data, and enacts low-level processing of the sensory data to yield an actionable, high-level input to logic system 38. In one embodiment, the sensor interface may perform sound- or voice-recognition on audio input data from the microphones. Such actions may generate text-based input or other high-level commands, which are received in logic system 38. Conversely, actuator interface 34 receives high-level instructions from logic system 38 and issues appropriate low-level commands and signals to autonomously actuable hardware 18, to actuate the hardware. The hardware may be actuated directly or indirectly (e.g., through a separate actuator). In this manner, various aspects of the state of the environment may be changed autonomously by computer 14. As noted above, the autonomously actuable hardware may include elements of a climate-control system 40, a home-theatre system 42, a lighting system 44, and a home-security system 46, as examples. Through network interface 36, logic system 38 sends and receives data across network 16. The various components of smart system 24 may be wired together or wirelessly interconnected.

In one, non-limiting embodiment, each depth camera 12 may be a KINECT® system available from Microsoft Corporation of Redmond, Wash. More generally, each depth camera may comprise any imaging system configured to acquire a time-resolved sequence of depth maps of one or more human subjects that it sights. As used herein, the term 'depth map' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, the depth camera may be configured to acquire two-dimensional image data from which a depth map is obtained via downstream processing.

In general, the nature of depth cameras 12 may differ in the various embodiments of this disclosure. For example, a depth camera can be stationary, movable, or autonomously motile. Any non-stationary depth camera may have the ability to image an environment from a range of perspectives. In one embodiment, brightness or color data from two, stereoscopically oriented imaging arrays in the depth camera may a depth map via correlation-based stereo imaging. In other embodiments, the depth camera may be configured to project on the subject a structured infrared (IR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the depth camera may project a pulsed infrared illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays.

Figure 3:
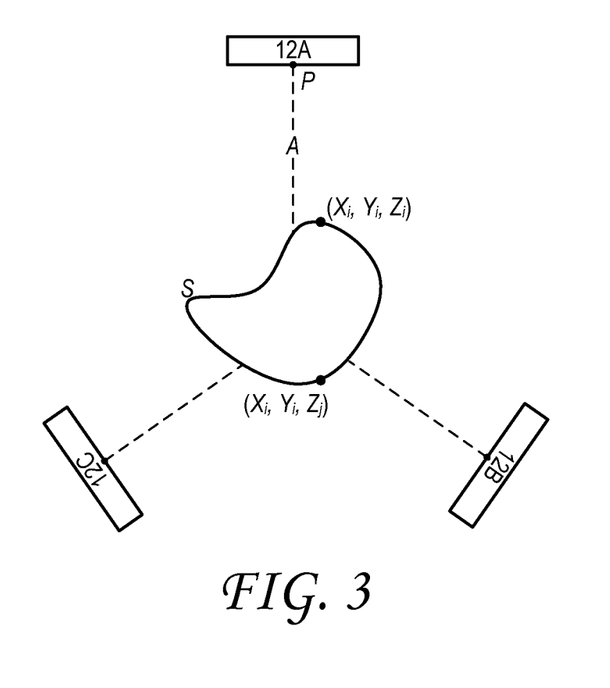
FIG. 3 schematically shows multiple depth maps sighting the same subject in accordance with an embodiment of this disclosure.

In some cases, a plurality of depth cameras 12 may sight the same subject, with each camera providing a different view of that subject. An advantage of this scenario is illustrated in the diagram of FIG. 3. As shown in the drawing, a single depth camera may image only a limited portion of a surface S—the portion in sight from a single point of view P, which lies at a terminus of the optical axis A of the camera. In a single-axis depth map, the portion in sight is defined as a Cartesian triplet $(X_i, Y_i, Z_i)$, with one Z coordinate associated with a given (X, Y) pair. In contrast, multiple depth cameras may image an extended portion of a surface, in sight together only from multiple points of view—i.e., from the termini of the different optical axes of the cameras. In a multi-axis depth map, this extended portion is also defined in terms of Cartesian triplets, but more than one Z coordinate may be associated with a given (X, Y) pair. In this manner, front and back portions of a surface may be represented in the same multi-axis depth map. As in the case of a single-axis depth map, a time-resolved sequence of multi-axis depth maps may be assembled in frames, as video. Accordingly, the 'depth video', 'depth data' and 'depth images' referred to herein may comprise single- or multi-axis depth maps of any complexity.

When included in smart system 24, each color camera 26 may image visible light from the observed scene in a plurality of channels (e.g., red, green, blue, etc.), mapping the imaged light to an array of pixels. Alternatively, a monochromatic camera may be included, which images the light in grayscale. The color or brightness values for all of the pixels collectively constitute a digital color image. In one embodiment, the depth and color cameras may have the same resolutions. Even when the resolutions differ, the pixels of the color camera may be registered to those of the depth camera. In this way, both color and depth information may be assessed for each portion of an observed scene. When included in smart system 24, each microphone 28 may pick up directional and/or non-directional sound from an observed human subject or other source in environment 10. It will be noted that the sensory data acquired through sensor interface 32 may take the form of any suitable data structure, including one or more matrices that include X, Y, Z coordinates for every pixel imaged by the depth camera, red, green, and blue channel values for every pixel imaged by the color camera, in addition to time resolved digital audio data.

Depth cameras 12, as described above, are naturally applicable to observing people. This is due in part to their ability to resolve a contour of a human subject even if that subject is moving, and even if the motion of the subject (or any part of the subject) is parallel to the optical axis of the camera. This ability is supported, amplified, and extended through dedicated logic architecture in computer 14 or in the depth camera itself. In sum, the computer is configured to process depth data received from the depth cameras, and to compute certain aspects of any human subject found in the depth data. In one embodiment, depth data may be received from a plurality of depth cameras, which provide a corresponding plurality of fields of view of the environment. In such embodiments, the computer may be configured for complex processing of depth video, such as tracking a human subject from one field of view to another.

Figure 4:
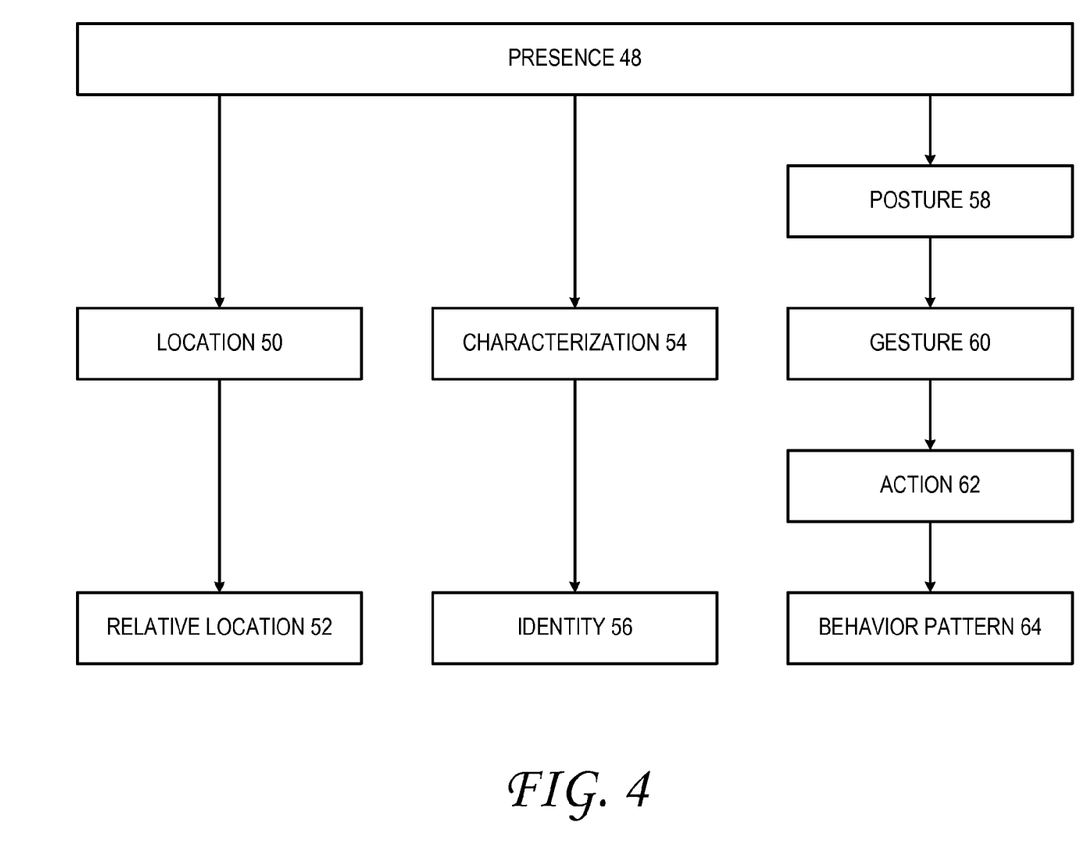
FIG. 4 is a chart summarizing aspects of a human subject that may be computed through processing of depth data in accordance with an embodiment of this disclosure.

The chart in FIG. 4 summarizes particular aspects of a human subject that can be revealed through appropriate processing of depth data. The chart has three columns, with aspects of increased complexity appearing farther down each column. Accordingly, determination of a given aspect may require prior determination of the aspect immediately above it.

The most basic aspect of a human subject that can be revealed from depth data is the mere presence 48 of the subject in the environment imaged by the depth data. Through appropriate depth-image processing, a given locus of the depth map can be recognized as belonging to a human subject (as opposed to some other thing, e.g., furniture, a wall covering, a cat). In one embodiment, pixels that belong to a human subject are identified by sectioning off a portion of the depth data that exhibits above-threshold motion, and attempting to fit that section to a generalized geometric model of a person. If a suitable fit can be achieved, then the pixels are recognized as those of a human subject. In other embodiments, human subjects may be found by contour alone, irrespective of motion.

Another aspect of a human subject is his or her location 50. With a depth camera positioned at known coordinates and aligned in a known direction, the location of a human subject may be represented on a suitable coordinate system—e.g., a 3D coordinate system. Even if the coordinates and/or alignment of the depth camera are variable, logic system 38 may be configured to compute them based on an image of one or more fixed objects sighted by the depth camera. As noted above, smart system 24 may include a plurality of depth cameras, in the same room or in different rooms of an environment. Accordingly, the coordinate system on which a human subject is represented may be commonly shared by two or more of the depth cameras. In one embodiment, the coordinate system may be shared globally by all of the depth cameras in an environment.

Another aspect of a human subject is his or her location 52 relative to that of another human subject in the environment. For example, person A may be above person B, below person B, five feet away from person B, in the same room, in a different room, etc. In scenarios in which a plurality of human subjects are found concurrently, logic system 38 may be configured to reveal the detailed arrangement among the subjects—e.g., three people on one side of the room, two people on the other, one person in a different room.

Another aspect of a human subject is its characterization 54 in terms of size and shape. In some embodiments, the fitting procedure used to find a human subject may be skeletal-based, as described hereinafter. Accordingly, the fitting may yield estimated skeletal metrics for the human subject, such as leg, arm or torso length, overall body height, and/or width across the hips. In some embodiments, smart system 24 may acquire brightness- or color-image data in the locus of the found human subject. By processing such data along with the depth data, logic system 38 may provide further characterization of the human subject in terms of hair color and/or facial features. If voice data from microphones 28 is available also, characterization 54 may further include voice recognition of the human subject.

Another aspect of a human subject is his or her identity 56 as a particular person—e.g., a person known or expected to be present in environment 10. Known human subjects may include residents of the environment—family members such as Mom, Dad, Junior, Grandpa, etc. Body metrics and other features (e.g., spoken language, voice pitch, hair color and/or facial features) of known human subjects may be stored in a data base in computer 14, or on network 16. After a new human subject is characterized, a matching procedure enacted in logic system 38 may search the stored data for a match to the newly characterized human subject, and thereby attempt to identify the human subject. In some embodiments, a more generic identity may be applied to any human subject for whom a match cannot be found in the database—e.g., guest or intruder. Alternatively, or in addition, a human subject may be identified via a wearable marker such as a mobile phone, radio-frequency identification (RFID) tag, or visually readable tag. In yet other embodiments, a human subject may self-identify—e.g., by announcing his or her name.

Another aspect of a human subject is his or her posture 58. In embodiments in which a skeletal-fitting approach is used to find and/or characterize a human subject in terms of size and shape, the angles formed at the various joints of the skeleton may define the overall posture of the human subject—e.g., standing or lying down, sitting with legs crossed, arms folded, etc.

The aspects summarized above are static aspects, which, in principle, could be captured in still depth data. Other aspects of a human subject may be revealed in a time-resolved series of depth images—i.e., depth video. This is true of gesture 60, which may be defined as a change in posture, or as a sequence of different postures enacted by a human subject. One example of a gesture is the raising of a hand above one's head, which includes an initial posture with the hand lowered, a final posture with the hand raised, and may include one or more intervening postures in which the hand is only partly raised. One advantage of using depth video as a basis for gesture recognition is that a gesture can be recognized even when the motion that defines the gesture is parallel to the optical axis of the camera.

Where very accurate depth data is available, even quite subtle changes in posture may be resolved, such as the skeletal change that occurs when a person inhales and then exhales. Thus, breathing is a detectable gesture in the present context. Similarly, very accurate microphone input may enable the detection of a person's heartbeat. Both heart rate and respiration rate, accordingly, are aspects of a human subject than can be interrogated via a suitably equipped smart system 24.

Another aspect of a human subject is an action 62, which may be defined as a series of recognizable gestures enacted by the subject. One example action is washing one's hands. This action can be defined in terms of its component gestures, which minimally may include reaching in the direction of a water faucet, rubbing one's hands together, and reaching again in the direction of the faucet.

Yet another aspect of a human subject is a behavior pattern 64. A behavior pattern may be defined as an action or series of actions executed by a human subject in some sequence and/or repeated with some frequency. Consistent with the descriptions above, washing one's hands and feeding a baby are both actions. Washing one's hands before feeding the baby is a recognizable behavior pattern; so is washing one's hands five times a day.

The non-limiting example configurations described above enable various methods for trend assessment, rules-compliance assessment, and the control of autonomously actuable hardware in an environment. Some such methods are now described, by way of example, with continued reference to the above configurations. It will be understood, however, that the methods here described, and others within the scope of this disclosure, may be enabled by different configurations as well. The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local computer and transmitted to a remote computer for processing, that data can be anonymized in a known manner. In other embodiments, personal data may be confined to a local computer, and only non-personal, summary data transmitted to a remote computer.

Figure 5:
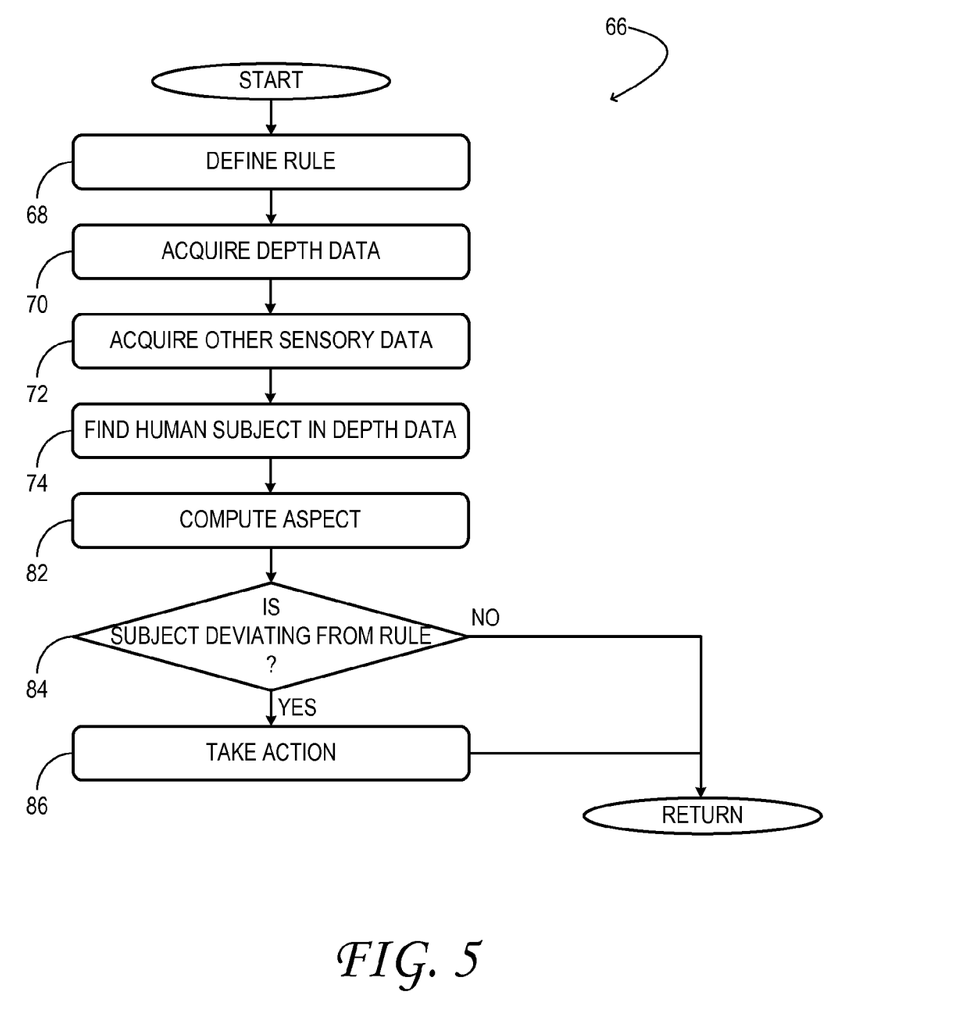
FIG. 5 illustrates an example method for assessing rules compliance in an environment in accordance with an embodiment of this disclosure.

FIG. 5 illustrates an example method 66 for assessing rules compliance in an environment. The method may be enacted via a smart system that includes a computer, as described hereinabove. At 68 of method 66, a rule is defined in the logic system of computer 14. A 'rule', as used herein, is any expected norm of any of the aspects from FIG. 4. Rules may be different for different individuals in the same environment. A 'deviation' from a rule is a departure from the expected norm. In one embodiment, the rule may be defined by a steward of the environment. The steward may input the rule via any available input mechanism of the computer—e.g., a keyboard, mouse, or natural input componentry (NIC) as described herein. In one embodiment, the rule may be relevant to the health of one or more persons in the environment. In another embodiment, the rule may be relevant to security and/or personal safety in the environment. For example, the rule may indicate that no unidentified person is allowed in the environment. As such, a given rule may apply to one human subject in an environment (e.g., a guest or identified person) but not apply to another human subject (e.g., an identified family member).

At 70 depth data is acquired from one or more depth cameras of the smart system, which are operatively coupled to the computer. At 72 other sensory data is optionally acquired—data from a color camera, a microphone, or a motion sensor, for example. At 74 one or more human subjects are found in the depth data.

In one particular embodiment, computer 14 may analyze the depth data to distinguish human subjects from non-human subjects and background. To this end, each pixel of the depth map may be assigned a person index that identifies the pixel as imaging a particular human subject or non-human element. As an example, pixels corresponding to a first person can be assigned a person index equal to one, pixels corresponding to a second person can be assigned a person index equal to two, and pixels that do not correspond to a human subject can be assigned a person index equal to zero. Person indices may be determined, assigned, and saved in any suitable manner.

Computer 14 may further analyze the pixels of a depth map believed to reveal a human subject, in order to determine what part of the subject's body each pixel corresponds to. A variety of different body-part assignment techniques can be used to this end. For example, each pixel of the depth map with an appropriate person index may be assigned a body part index. The body part index may include a discrete identifier, confidence value, and/or body part probability distribution indicating the body part, or parts, to which that pixel is likely to image. Body part indices may be determined, assigned, and saved in any suitable manner.

In one non-limiting example, machine-learning may be used to assign each pixel a body part index and/or body part probability distribution. The machine-learning approach analyzes a human subject using information learned from a previously trained collection of known poses. During a supervised training phase, for example, a variety of different people are observed in a variety of different poses; trainers provide ground truth annotations labeling different machine-learning classifiers in the observed data. The observed data and annotations are used to generate one or more machine-learning algorithms that map inputs (e.g., observation data from a depth camera) to desired outputs (e.g., body part indices for relevant pixels).

Figure 6:
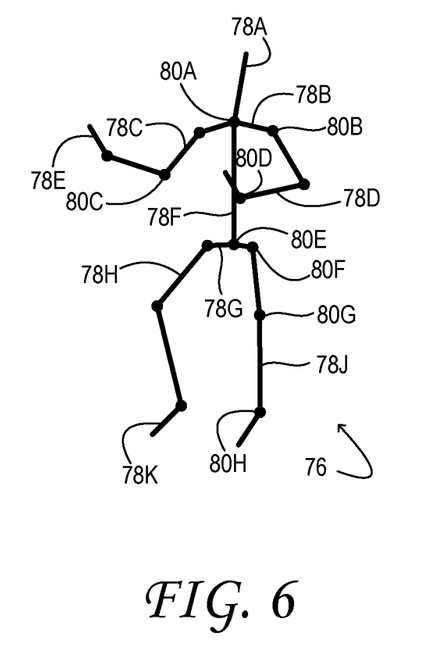
FIG. 6 shows aspects of an example virtual skeleton in accordance with an embodiment of this disclosure.

In some embodiments, a virtual skeleton is fit to the pixels of depth data believed to correspond to a human subject. FIG. 6 shows an example virtual skeleton 76 in one embodiment. The virtual skeleton includes a plurality of skeletal segments 78 pivotally coupled at a plurality of joints 80. In some embodiments, a body-part designation may be assigned to each skeletal segment and/or each joint. In FIG. 6, the body-part designation of each skeletal segment 78 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 80 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 6 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any or all of these parameters for each joint. In this manner, the metrical data defining the virtual skeleton—its size, shape, orientation, position, etc.—may be assigned to the joints.

Via any suitable minimization approach, the lengths of the skeletal segments and the positions and rotational angles of the joints may be adjusted for agreement with the various contours of the depth map. This process may define the location and posture of the imaged human subject. Some skeletal-fitting algorithms may use the depth data in combination with other information, such as color-image data and/or kinetic data indicating how one locus of pixels moves with respect to another. As noted above, body-part indices may be assigned in advance of the minimization. The body part indices may be used to seed, inform, or bias the fitting procedure to increase the rate of convergence. For example, if a given locus of pixels is designated as the head of the subject, then the fitting procedure may seek to fit to that locus a skeletal segment pivotally coupled to a single joint—viz., the neck. If the locus is designated as a forearm, then the fitting procedure may seek to fit a skeletal segment coupled to two joints—one at each end of the segment. Furthermore, if it is determined that a given locus is unlikely to correspond to any body part of the subject, then that locus may be masked or otherwise eliminated from subsequent skeletal fitting. In some embodiments, a virtual skeleton may be fit to each of a sequence of frames of depth video. By analyzing positional change in the various skeletal joints and/or segments, the corresponding movements—e.g., gestures, actions, behavior patterns—of the imaged human subject may be determined. The foregoing description should not be construed to limit the range of approaches that may be used to construct a virtual skeleton, for a virtual skeleton may be derived from a depth map in any suitable manner without departing from the scope of this disclosure. Moreover, despite the advantages of using a virtual skeleton to model the human subject, this aspect is by no means necessary. Data from one or more depth cameras may be used to assess trends and/or rules compliance, or to actuate hardware in the environment even without construction of a virtual skeleton. In lieu of a virtual skeleton, raw point-cloud data may be used, for example.

Returning now to FIG. 5, at 82 of method 66 one or more aspects of the found human subject are computed from the depth data. In one embodiment, the computed aspect may include a location of the human subject on a suitable coordinate system. In embodiments in which the human subject is first among a plurality of human subjects found in the depth data, the computed aspect may include the location of the first human subject relative to the other human subjects. In this way, the detailed arrangement of human subjects may be determined. In another embodiment, the computed aspect of the human subject may include a characterization of a size and/or shape of one or more physical features of the human subject. In another embodiment, the computed aspect of the human subject may include an identity of the human subject determined from among a plurality of candidate human subjects. In another embodiment, the computed aspect of the human subject may include a posture of the human subject. In another embodiment, the computed aspect of the human subject may include a gestural change in the posture of the human subject. In another embodiment, the computed aspect of the human subject may include an action of the human subject as defined by a series of gestural changes in the posture of the human subject. In yet another embodiment, the computed aspect of the human subject may include a behavior pattern of the human subject as defined by a series of actions. Furthermore, these and other aspects may be considered independently or collectively in some embodiments.

At 84 of method 66, it is determined based on the computed aspect, whether the human subject is complying with or deviating from the one or more rules defined at 68. In one embodiment, the determination of whether the human subject is complying with or deviating from a rule may be further based on the other sensory data acquired at 72 of method 66; it may depend on color-image data from color cameras 26, motion data from motion sensors 30, or audio data from microphones 28, for example. If the human subject is deviating from a rule, then the method advances to 86, where appropriate action is taken. Otherwise, the method returns.

In some embodiments, the action taken at 86 may include issuance of notification—i.e., a message—to the effect that a deviation from a predefined rule has occurred in the environment. Computer 14 may autonomously transmit such a message to a communication device capable of receiving the message—e.g., a device external to the environment, or located in a different part of the environment from where the deviation occurred. The notification may be issued via one or more of text transmission, image transmission, voice transmission, video transmission, or any other suitable delivery mechanism. Specific transmission modalities may include SMS, email, video feed, intercom, etc. In one embodiment, the notification may be issued to a steward of the environment. In this and other embodiments, the notification may be issued to the person observed to deviate from the rule; it may be directed as feedback—e.g., "Do you need assistance?" In some embodiments, the notification may be broadcast throughout the environment via a public address system. In embodiments in which notification is issued to more than one recipient, the notification scheme may be parallel or sequential. In the parallel case, for example, the steward and the person observed to deviate from the rule may be issued notification concurrently. In the sequential case, the subject may be issued notification first; the steward may be notified only if the subject is nonresponsive—e.g., intransigent, unconscious, or unable to respond. In still other embodiments, action at 86 may be taken via autonomously actuable hardware 18. Such action may include raising an alarm in a home-security system, turning on the lights, or silencing a home-theatre system, for example.

Method 66 represents numerous, more specific usage scenarios, a few of which will now be described. In one example, the rule referred to hereinabove may define which persons are allowed in a home or other environment, or in a specified part of the home. Furthermore, the rule may indicate certain days of the week, or hours of the day, that particular persons are allowed in the home. In one scenario, a smart system may find a person in the living room of the home at 2:00 in the morning. Immediately the smart system works to determine whether that person is a family member or other resident of the home. If the person in the living room is identified as a family member, then no rule has been broken, so no action may be taken. However, if the person is not identified as a family member, then the security system in the home may be triggered to sound an alarm, notify the head-of-household and/or the police, etc. In this manner, computation of various aspects of the person—e.g., the person's height, body dimensions, and hair color (as well as the mere fact that it is a person, and not a cat)—may prevent numerous false alarms based on unexpected motion in the home.

In this and other scenarios, a smart system may simultaneously assess compliance with a plurality of rules involving the same or different persons. For instance, although no action may be taken due to the mere presence of a family member in the living room at 2:00 am, certain more particular aspects of a family member, if revealed, may trigger appropriate action. If a family member is lying face-down on the living-room floor, for example, the system then may notify the head-of-household, another family member, or an emergency-response service. In a different example, it may be allowable for an adult family member, but not a child, to be in the living room watching television at 2:00 am. In other rooms of the house—e.g., a woodshop, gun closet, or wine cellar—children may not be permitted at any time. Accordingly, if the system determines that a child (identity 56 in FIG. 4) is in one of these rooms (location 50), or is awake past a certain time (action 62), or is watching too much television (behavior pattern 64), then the head-of-household may be notified.

A suitably configured smart system may also be used to observe elderly persons or convalescents. In this scenario, a suitable rule may be posture-based; it may include that the person should either be standing or sitting in a chair or lying down on a bed, and that the person should not lie down for more than eight hours before getting up again. Deviation from this rule could indicate that the elderly person has fallen down or suffered a setback of some kind, and that a loved one or care giver should be informed.

In other examples, an observed gesture of a person may constitute a deviation from a predefined rule—e.g., grasping one's chest, exhibiting labored breathing, or the bodily symptoms of a seizure. In some cases, deviation from a rule may be detected by observing facial and/or vocal features of the observed person—e.g., the drooping of one's face and/or slurring one's speech that often follows a stroke. In these and other embodiments, the notification issued when a rule is violated may include image and/or voice data recorded at the time when the rule-violation occurs. Naturally, such image data may be storable on the device on which it is received, so that a health-care provider can later examine it. Incidentally, this feature may also be used to immortalize rule-violations that are positive and/or memorable, such as baby's first steps.

Besides simple gestures and actions, more complex behavior patterns of the observed person may warrant the attention of a care giver. For example, it has been found that face-to-face contact with other people correlates with life expectancy in the elderly. Accordingly, a smart system may be configured to keep track of when an elderly person receives a visitor; if he or she receives visitors at less than a threshold frequency, a loved one may be notified. Likewise, a smart system may be configured to observe when the elder takes medication; a care giver may be notified when a dosage is missed, or when the medication is taken too frequently.

Similarly, a suitably configured smart system may be configured to observe a baby in a home nursery, and from the baby's actions and behaviors, determine whether there is cause to alert a care giver. In this scenario, an appropriate rule may include that the baby should spend no more than a few minutes face-down in the crib, or standing up in the crib, or crying. By observing the baby over time, the smart system may determine whether the baby is growing at the expected rate; if slower growth is observed, a parent may be notified.

Other example rules may define the manner and/or frequency of exercise, sports training, and/or physical therapy that a person in an environment is required to do. By observing the person in the room in which such an activity is done, the smart system may determine which rules are being complied with or deviated from. Thus, when an observed person strays from the required regimen, or trains improperly, that person may be notified. In still other scenarios, rules may define allowed behaviors and access for laborers admitted to the home to perform a particular task. The kitchen remodeler, for example, is not expected to enter the bedroom. If he does, the homeowner may be notified.

Figure 7:
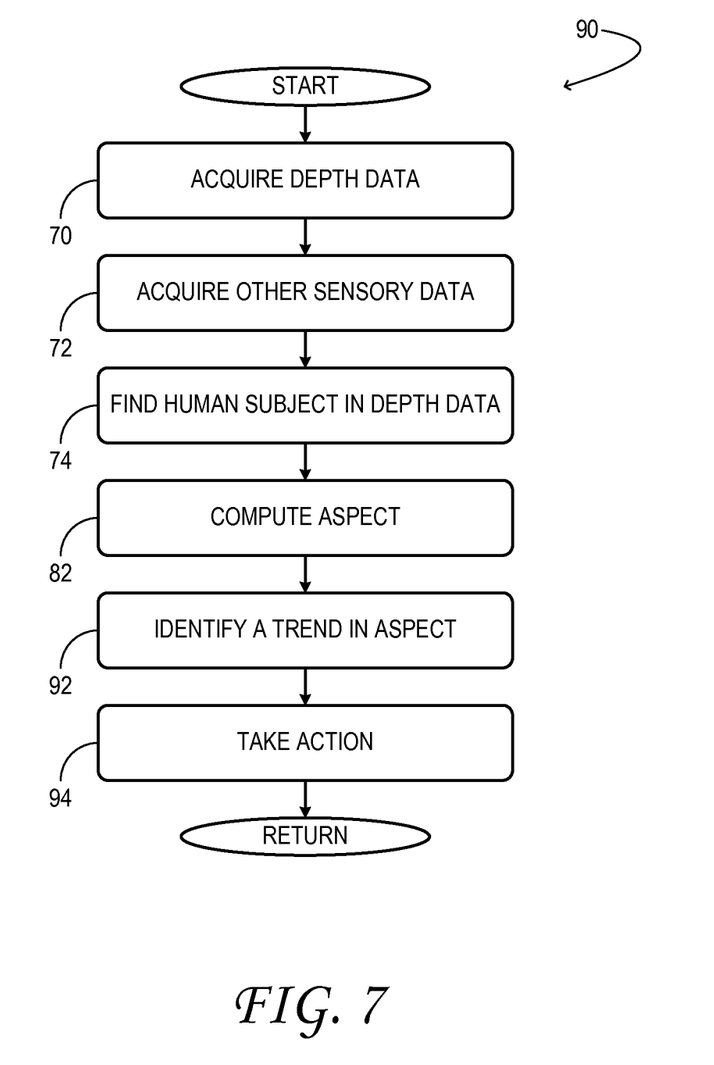
FIG. 7 illustrates an example method for assessing a trend in accordance with an embodiment of this disclosure.

FIG. 7 illustrates an example method 90 for assessing a trend. The method may be enacted via a smart system that includes a computer, as described hereinabove. At 70 of method 90, depth data is acquired from one or more depth cameras of the smart system. At 72 other sensory data is optionally acquired. At 74 one or more human subjects are found in the depth data, and at 82, one or more aspects of the human subject are computed.

At 92 of method 90, a trend is identified based on at least one of the computed aspects. As used herein, a 'trend' may be defined as any change (or lack of change) over time in a computed aspect—e.g., a change in a human subject's location, body size or shape, action, gesture, or behavior pattern. At 94 appropriate action is taken pursuant to the trend being identified. In one embodiment, such action may include reporting the identified trend—e.g., to the person exhibiting the trend or to the steward of the environment, or broadcast throughout the environment, etc. In other embodiments, the appropriate action may include actuation of hardware in the environment.

Like previous method 66, method 90 also represents numerous, more specific usage scenarios, a few of which will now be described. In one scenario, the trend identified at 92 may be a trend in a child's growth. Such a trend may be revealed through observation and repeated characterization 54 of the child over time. In other examples, the trend may be related to actions 62 or behavior patterns 64. For example, one trend may reveal that in a given week, a baby is holding his or her head up 50% longer than in the week before. Another trend may reveal that in a given week, a toddler is reaching or grabbing for food 10% more than in the week before. Another trend may reveal that in a given month, an elder is taking 20% fewer steps than in the month before. Another trend may reveal that the time a child spends on homework is decreasing and that the time she spends using her smart phone is increasing. Yet another trend may reveal that a person recovering from an arm injury is regaining lost mobility in a quantifiable manner—e.g., 2% greater range in elbow movement per day, etc.

It will be understood that the methods here described may be used separately or together. Method 66 and method 90 may be combined, for instance, such that the trend identified in method 90 is used as the rule in method 66. In other words, the rule of method 66 may be a machine-learned rule—a trend identified by prior resolution of a resolved aspect of a human subject from prior depth data. In a given family, for example, it may be observed that a baby is left to cry for five minutes, on average, before Mother attends to him. Accordingly, the smart system may be configured to delay notifying the care giver until it records five minutes of continuous crying, at which point the care giver is notified. In this example, the 'five-minute rule' is not directly entered into the smart system, but is determined automatically by the system via a machine-learning approach. In other examples, the observed rule may reflect the current growth rate of a healthy baby, and a deviation from the rule may reflect a growth spurt on the one hand, or a medical condition on the other, of which a care giver may be notified.

In yet other examples, the smart system may learn, from observing home residents' behaviors over time, that the garbage is to be taken out every Thursday night, and the recycling every other Thursday night. This is an example of a learned rule. When the system determines, at 10 p.m. on a given Thursday night, that no one has taken out the garbage or recycling, the home owner would then be reminded. Analogous rule learning and rule-compliance assessment could be applied to watering house plants, cleaning a litter box, doing homework at a given time of day, etc.

Installed in a factory, for example, a smart system could be configured to determine what the norm is and then spot deviations from the norm—e.g., a worker not at his or her usual post. By analyzing behavior patterns, the system may even identify workers who steal goods.

In the foregoing scenarios, a local environment is observed in order to define a rule, and compliance with the rule is assessed locally (in the same environment). In other scenarios, the rule may be defined through observation of a global environment. For example, some rules may be learned from observing not one but many toddlers, in a plurality of networked, smart-system equipped homes. Through statistical analysis of the toddlers' actions and/or behavior patterns, various rules may be recognized. Then, compliance with one or more of the rules by one's own toddler may be assessed locally. A smart system supporting this feature may be configured to report when a toddler takes more steps than 75% of all observed toddlers, for example. It is to be understood that the above scenario is readily generalized to embrace virtually any activity in which aggregate, crowd-sourced behavior data from a plurality of smart systems are used to define a rule. In addition, a smart-system steward may optionally subscribe to a set of smart-system rules published by a third-party authority—e.g., rules on child care, elder care, or fitness. Such rules may be formatted to be accepted as input by the smart-system computer. In one embodiment, the third-party authority may access a computer program or service to enumerate appropriate rules and have those rules published (on the Internet, for example) in a smart-system compatible format.

Figure 8:
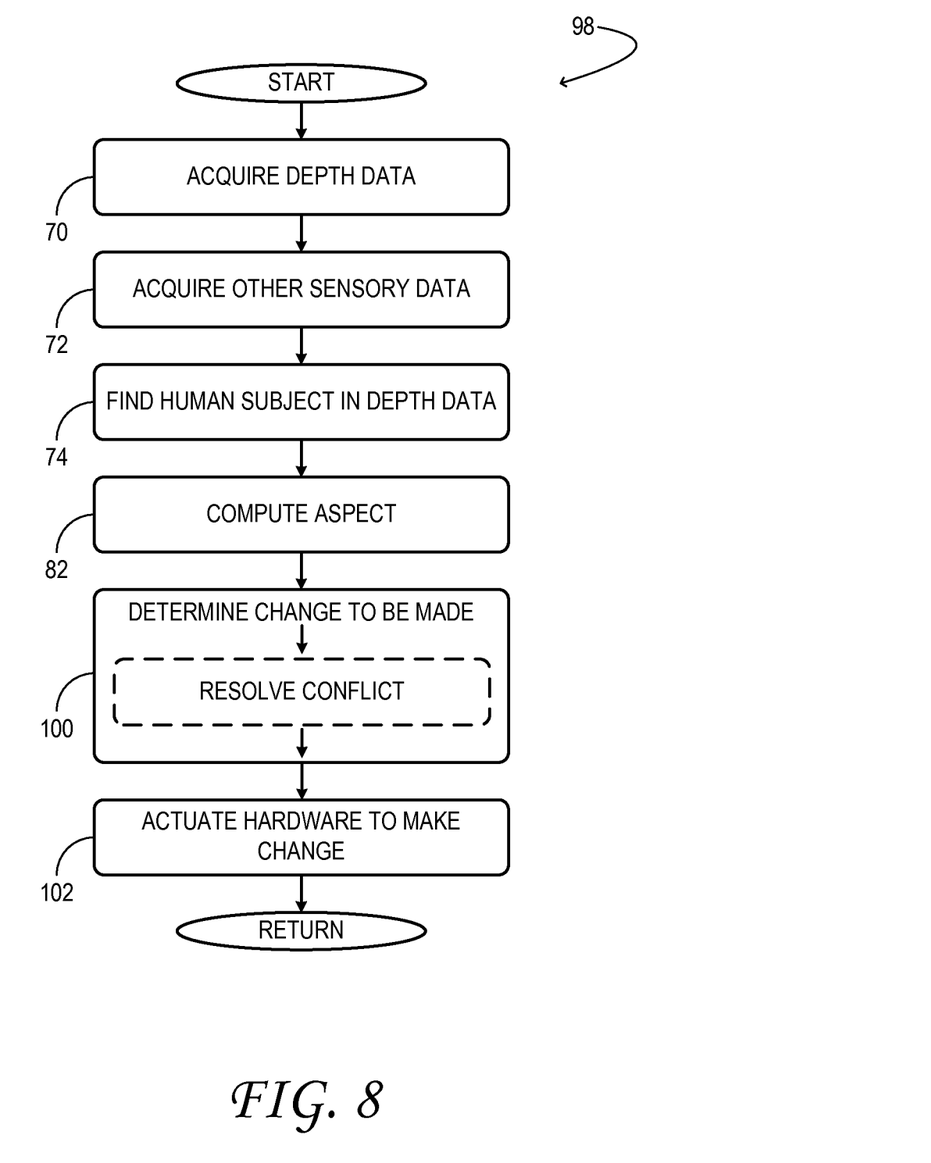
FIG. 8 illustrates an example method for controlling autonomously actuable hardware in an environment in accordance with an embodiment of this disclosure.

FIG. 8 illustrates an example method 98 for controlling autonomously actuable hardware in an environment. The method may be enacted via a smart system that includes a computer, as described hereinabove. At 70 of method 98, depth data is acquired from one or more depth cameras of the smart system. At 72 other sensory data is optionally acquired. At 74 one or more human subjects are found in the depth data, and at 82, one or more aspects of the human subject are computed.

At 100 a desired change to be made in the environment is determined based on the resolved aspect—e.g., the human subject's location, identity, posture, gesture, action, or behavior pattern. In some embodiments, this action may include resolution of a conflict between a perceived preference of one human subject and that of another, as further described hereinafter. In one embodiment, the change may include a change in a target locus of an audio and/or video system. In other embodiments, the change may include a change in temperature and/or lighting intensity in a locus of the environment. In another embodiment, the change may include a change in a position or locking state of a door or window in the environment, or adjustment of an electrically actuable valve. In still other embodiments, the change may include a change in state of virtually any autonomously actuable device, such as a home-entertainment system, climate-control system, or even a cook stove. At 102 of method 98, autonomously actuable hardware in the environment is actuated in order to make the desired change.

As with the foregoing methods, method 98 also represents numerous, more specific usage scenarios, a few of which will now be described. In one scenario, smart system 24, installed in a family home, may be configured to identify a person as a family member as that person walks through the front door. Thereafter, certain actions may be taken based on the identity of the person, the time of day, and other factors. For example, if the family member habitually listens to music upon arriving home, the smart system may preemptively turn on a sound system in the home and tune it to the person's favorite radio station or playlist. If the person sits down in the living room, the system may automatically tune the sweet spot of the sound system to the person's location, to provide the best stereophonic effect. If the room is dark when the person arrives home, the smart system may automatically turn on the lights, but if it is late at night when the person arrives home, the lights may be dimmed. Based on the person's temperature preferences learned over time, the system may automatically adjust a thermostat in a room where the person is seated, to a desirable temperature. Moreover, the temperature change may be enacted preemptively, in anticipation of the person entering the room at an expected time—based on a previously established behavior pattern of that person.

If the person begins to exercise, the smart system may automatically lower the temperature of the room and/or switch the radio to a news station, based on the prior listening habits of that person during exercise. Later, if the person gets up to go to the bathroom, the sweet spot of the sound system may be adjusted to follow him, continuously providing the best stereophonic effect along the way. If it is determined that the person is preparing to shower, the smart system may adjust various shower settings—e.g., water temperature and pressure, exhaust fan, etc., according to his or her showering habits.

In some cases, the current state of hardware usage in an environment may affect how a given gesture is interpreted. For example, if a person is watching video on a tablet computer, and that person makes a gesture such as spreading his arms apart, that gesture may trigger the smart system to route the video to a large-format display screen. However, the same gesture may be interpreted in other ways if the person was not already watching the video.

In some scenarios, a gestural aspect determined at 82 of method 98 is made intentionally by the observed person to signal the change to be made in the environment. Many people—especially children, the elderly, and disabled persons—may find it easier to make gestures to control aspects of an environment, rather than actuating controls directly. In some embodiments, a control gesture may imitate an operation typically enacted with a hardware controller to make a corresponding change in the environment. For example, the person may turn an imaginary dial clockwise to raise the set-point temperature of a thermostat. In other examples, the gesture may be a natural user input unrelated to operations used with hardware controllers. For example, a person may raise his arms as a signal to increase the volume of the sound system, or put a finger to his lips to mute the volume. Other intentional signals—machine-learned and/or predefined—may be used to advance through a series of media channels or playlists of a multimedia system, to turn on or dim the lights in a room, or request assistance from another. Conversely, the computed aspects of the person used to intuit the desired change may be collateral or even unintentional in some embodiments. For example, the act of walking from the living room to the kitchen may cause the lights to be turned off in the living room and turned on in the kitchen. However, the intentions of the person walking may have nothing to do with control of the lighting; he or she may just want a sandwich. As such, the person enjoys the benefits of a lighted path without having to take additional action to control the lights. Another such example is to control the size or amount of text displayed on a screen depending on how close the viewer is to the screen. When the viewer is close to the screen, more and/or more detailed information may be displayed. When the viewer is farther from the screen, the information may be summarized to a higher level and/or presented in a larger typeface. These actions may be taken without any direct input from the viewer.

In some usage scenarios, different preferences of the various people in an environment—e.g., family members—may conflict with each other, such that a conflict-resolution protocol is desirable. In one example protocol, the family members may be ranked according to one or more trumping orders or heuristics established for the environment. For example, an elder child's preferences may trump a younger child's preferences. Father's preferences trump the children's preferences. Mother's preferences may trump the father's and the children's preferences. Accordingly, the smart system may be configured to recognize a preference of one person, to apply a heuristic to rank the revealed preference against preferences of others revealed in the depth data, and based on the preference and rank, to determine a change to be made in the environment. In other words, if gestures or other aspects of different persons define conflicting changes to be made in the environment, the hardware may be actuated to make the change consistent with the desire of the higher ranking person. Nevertheless, the smart system may also be configured to holistically consider the apparent desires of a plurality of persons in the environment, and actuate the appropriate hardware to effect a compromise among conflicting preferences.

In some scenarios, aspects of different individuals—e.g., the arrangement of people in the house, or in a room of the house—may be the factor that determines the change to be made in an environment. For example, when various people in a room are separated from each other or not speaking to each other, the volume of the sound system may be set to a relatively high level. However, when the smart system detects that two or more people are close together and/or speaking, it may automatically lower the volume. In another example, the smart system may be configured to command a climate control system to actively control the temperature only on those levels or rooms of a house in which people are currently present, or expected to be present based on their observed, habitual behaviors. Likewise, by knowing when people are actually present in the home, and whether those people are awake or asleep, the system may intelligently determine when to activate or deactivate a hot water heater. Thus, the smart system may be configured to not only provide for the comfort and convenience of the residents, but also to reduce heating and cooling costs and save energy.

As noted above, the smart system may use machine learning to intuit a person's desires from his or her gestures, actions, or behavior patterns. As such, machine-learning techniques such as 'reinforcement learning' may be used to buttress the approach. For example, the system may provide manual controls that override the autonomous actuation of hardware in the environment. Instances of direct actuation of a manual control by a person would then be entered into a database for further training of the smart system. An even simpler variant would be a 'thumbs-up' or 'thumbs-down' control to provide feedback to the system indicating whether its actions were on- or off-target, in the judgment of a homeowner or other steward of the environment.

Again it will be emphasized that the methods here described may be used separately or together. In addition, elements of one method may be substituted into another for various advantages. The actions taken at 86 of method 66 and at 94 of method 90, for instance, may include actuating hardware as described in method 98. In one example scenario, if it is determined that an elder has fallen or is in distress, the lights in the home may be turned on, or the shower turned off, etc., in addition to the notification measures already described. In another example, an appropriate hardware response for a child watching television at 2:00 am might be to turn off the home-theatre system and light the way to bed. Conversely, any hardware response in method 90 may be accompanied by appropriate notification, as outlined in methods 66 and 90. In the context of energy efficiency in the home, for example, the system may notify the homeowner when it observes conditions, actions, or behaviors that cause inefficiency, in addition to (or instead of) actuating hardware to improve the efficiency.

In some embodiments, the methods and processes described herein may be tied to a computing system of one or more computing devices. In particular, such methods and processes may be implemented as a computer-application program or service, an application-programming interface (API), a library, and/or other computer-program product.

Computer 14 of FIG. 2 is one, non-limiting example of a computing system 103 that can enact one or more of the methods and processes described above. In other examples, the computing system may include more than one computer. Computing system 103 is shown in simplified form. Computing system 103 may take the form of one or more personal computers, server computers, tablet computers, home-entertainment computers, network computing devices, gaming devices, mobile computing devices, mobile communication devices (e.g., smart phone), and/or other computing devices.

Computing system 103 includes a logic machine 104 and a storage machine 106. Computing system 103 may optionally include a display subsystem 108, input subsystem 110, a communication subsystem, and/or other components not shown in FIG. 2.

Logic machine 104 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 106 includes one or more physical devices configured to hold instructions executable by the logic machine to implement the methods and processes described herein. When such methods and processes are implemented, the state of storage machine 106 may be transformed—e.g., to hold different data.

Storage machine 106 may include removable and/or built-in devices. Storage machine 106 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 106 may include volatile, nonvolatile, dynamic, static, read/write, read-only, random-access, sequential-access, location-addressable, file-addressable, and/or content-addressable devices.

It will be appreciated that storage machine 106 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 104 and storage machine 106 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms 'module,' 'program,' and 'engine' may be used to describe an aspect of computing system 103 implemented to perform a particular function. In some cases, a module, program, or engine may be instantiated via logic machine 104 executing instructions held by storage machine 106. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display subsystem 108 may be used to present a visual representation of data held by storage machine 106. This visual representation may take the form of a graphical user interface (GUI). As the herein described methods and processes change the data held by the storage machine, and thus transform the state of the storage machine, the state of display subsystem 108 may likewise be transformed to visually represent changes in the underlying data. Display subsystem 108 may include one or more display devices utilizing virtually any type of technology. Such display devices may be combined with logic machine 104 and/or storage machine 106 in a shared enclosure, or such display devices may be peripheral display devices.

When included, input subsystem 110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem may be configured to communicatively couple computing system 103 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 103 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claim is:

1. A residential control system, comprising:
a controller operatively coupled to one or more hardware components and one or more depth cameras each installed in a residential building, the depth cameras being arranged to image an interior of the residential building, the controller including a logic machine and an instruction-storage machine holding instructions that, when executed by the logic machine, cause the logic machine to:
find a human subject in depth data acquired with the one or more depth cameras;
compute an aspect of the human subject from the depth data, the computed aspect including a characterization of a size or shape of one or more physical features of the human subject and a behavior pattern of the human subject as defined by a series of actions of the human subject, the actions defined by a series of gestural changes in a posture of the human subject;
based on the computed aspect, determine an environmental change to be made in the residential building; and
actuate the one or more hardware components to make the environmental change.

2. The residential control system of claim 1 wherein the environmental change is a change in lighting intensity in the residential building, and wherein the one or more hardware components includes a lamp.

3. The residential control system of claim 1 wherein the environmental change is a change in temperature in a locus of the residential building, and wherein the one or more hardware components includes a thermostat.

4. The residential control system of claim 1 wherein the environmental change is a change in a position or locking state of a door or window in the residential building, and wherein the one or more hardware components includes a lock.

5. The residential control system of claim 1 wherein the environmental change includes a change in a target locus of audio and/or video, and wherein the one or more hardware components includes an audio/video system.

6. The residential control system of claim 1 wherein the computed aspect includes a gesture that the human subject makes intentionally, to signal the environmental change to be made in the residential building, and wherein the gesture imitates an operation enacted by a hardware controller to make the environmental change.

7. The residential control system of claim 1 wherein determining the environmental change to be made includes intuiting a change desired by the human subject based on the computed aspect.

8. The residential control system of claim 1 wherein the computed aspect reveals a location of the human subject on a coordinate system in the residential building.

9. The residential control system of claim 1 wherein the human subject is one of a plurality of human subjects found in the depth data, and wherein the computed aspect reveals a location of the human subject relative to the other found human subjects.

10. The residential control system of claim 1 wherein the computed aspect includes an identity of the human subject determined from among a plurality of candidate human subjects.

11. The residential control system of claim 1 wherein the environmental change to be made in the residential building is a first change based on a computed aspect of a first human subject, and wherein the instructions are further executable to:
  determine a second, conflicting change to be made in the residential building based on a computed aspect of a second human subject, wherein the one or more hardware components are actuated to make the first change only if the first human subject ranks higher than the second human subject according to a trumping heuristic established for the residential building.

12. A residential control system comprising:
  a sensor interface configured to receive depth data from a plurality of depth cameras installed in a residential building and arranged to image an interior of the residential building;
  a controller operatively coupled to the sensor interface, the controller including an instruction-storage machine holding instructions that, when executed by a logic machine, cause the logic machine to find a human subject in depth data acquired with the plurality of depth cameras, to compute an aspect of the human subject from the depth data, and based on the computed aspect, to determine an environmental change to be made in the residential building, wherein the computed aspect includes an identity of the human subject determined from among a plurality of candidate human subjects and a behavior pattern of the human subject as defined by a series of actions of the human subject, the actions defined by a series of gestural changes in a posture of the human subject; and
  an actuator interface operatively coupled to the controller and wirelessly coupled to one or more hardware components installed in the residential building and configured to actuate the one or more hardware components in order to make the environmental change.

13. The residential control system of claim 12 wherein the computed aspect includes a characterization of a size or shape of one or more physical features of the human subject.

14. The residential control system of claim 12 wherein the plurality of depth cameras provide a corresponding plurality of fields of view of the residential building, and wherein the instructions further cause the logic machine to track the human subject from one field of view to another.

15. The residential control system of claim 14 wherein the sensor interface is further configured to receive sensory data from at least one of a passive infrared sensor and a color-image sensor, and wherein the computed aspect of the human subject is computed further based on the sensory data.

16. The residential control system of claim 12 wherein the sensor interface is further configured to receive audio data from one or more microphones arranged in the residential building, and wherein the computed aspect of the human subject is computed further based on the audio data.

17. A residential control system comprising:
  a sensor interface configured to receive depth data from a plurality of depth cameras installed in a residential building and arranged to image an interior of the residential building, each depth camera providing a different field of view of the residential building;
  a controller operatively coupled to the sensor interface, the controller including an instruction-storage machine holding instructions that, when executed by a logic machine, cause the logic machine to find a human subject in depth data acquired by the depth cameras, to identify the human subject from a plurality of candidate human subjects, to recognize a preference of the human subject based on a computed aspect of the human subject, to apply a heuristic to rank the recognized preference against preferences of others recognized in the depth data, and based on the preference and rank, to determine an environmental change to be made in the residential building, wherein the computed aspect includes a characterization of a size or shape of one or more physical features of the human subject and a behavior pattern of the human subject as defined by a series of actions of the human subject, the actions defined by a series of gestural changes in a posture of the human subject; and
  an actuator interface operatively coupled to the controller and configured to actuate one or more hardware components in the residential building in order to make the environmental change.

* * * * *